(12) United States Patent
Nishide et al.

(10) Patent No.: US 8,290,671 B2
(45) Date of Patent: Oct. 16, 2012

(54) CONTROL SYSTEM FOR AUTOMATIC TRANSMISSION

(75) Inventors: Masaki Nishide, Okazaki (JP);
Shinichiro Murakami, Okazaki (JP);
Keisuke Umenaka, Kota-tawn (JP)

(73) Assignee: Aisin Aw Co., Ltd., Anjo-Shi (JP)

( * ) Notice: Subject to any disclaimer, the term of this patent is extended or adjusted under 35 U.S.C. 154(b) by 339 days.

(21) Appl. No.: 12/776,749

(22) Filed: May 10, 2010

(65) Prior Publication Data

US 2010/0318271 A1 Dec. 16, 2010

(30) Foreign Application Priority Data

Jun. 15, 2009 (JP) ................................. 2009-142481

(51) Int. Cl.
*F16H 61/18* (2006.01)
(52) U.S. Cl. ........ 701/63; 477/126; 477/906; 74/473.22
(58) Field of Classification Search .................... 701/62, 701/63; 477/125, 126, 156, 906; 74/473.21, 74/473.22
See application file for complete search history.

(56) References Cited

U.S. PATENT DOCUMENTS

| | | | | |
|---|---|---|---|---|
| 5,709,140 A | * | 1/1998 | Hirose | 91/459 |
| 6,634,991 B2 | * | 10/2003 | Itou et al. | 477/156 |
| 6,675,079 B2 | * | 1/2004 | Kwon | 701/31.1 |
| 7,540,824 B2 | * | 6/2009 | Hinami et al. | 477/126 |
| 2009/0171545 A1 | * | 7/2009 | Shimizu et al. | 701/60 |

FOREIGN PATENT DOCUMENTS

| | | |
|---|---|---|
| JP | 06-074333 A | 3/1994 |
| JP | 6-307533 A | 11/1994 |
| JP | 2006-220669 A | 8/2006 |
| JP | 2006-313003 A | 11/2006 |

OTHER PUBLICATIONS

International Search Report for PCT/JP2010/003210 mailed Jun. 29, 2010.

* cited by examiner

*Primary Examiner* — Paul N Dickson
*Assistant Examiner* — Timothy Wilhelm
(74) *Attorney, Agent, or Firm* — Sughrue Mion, PLLC

(57) ABSTRACT

A control system for an automatic transmission that does not require a cut-off valve, and that can inhibit a reverse control even if a detection unit for detecting a shift range fails. The control system includes a first friction engagement element, which is engaged in predetermined forward and reverse shift speeds, a detection unit that detects a shift range from shift ranges that include a forward range and a reverse range; a failure judgment unit for judging failure of the detection unit, and an avoidance unit for shifting to a forward shift speed that does not engage the first friction engagement element if the failure judgment unit determines that the detection unit has failed.

4 Claims, 7 Drawing Sheets

FIG.3

|   | C-1 | C-2 | C-3 | B-1 | B-2 | F-1 |
|---|---|---|---|---|---|---|
| P |   |   |   |   |   |   |
| REV |   |   | ○ |   | ○ |   |
| N |   |   |   |   |   |   |
| 1ST | ○ |   |   |   | (○) | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

※ (○) : ENGINE BRAKE IN OPERATION

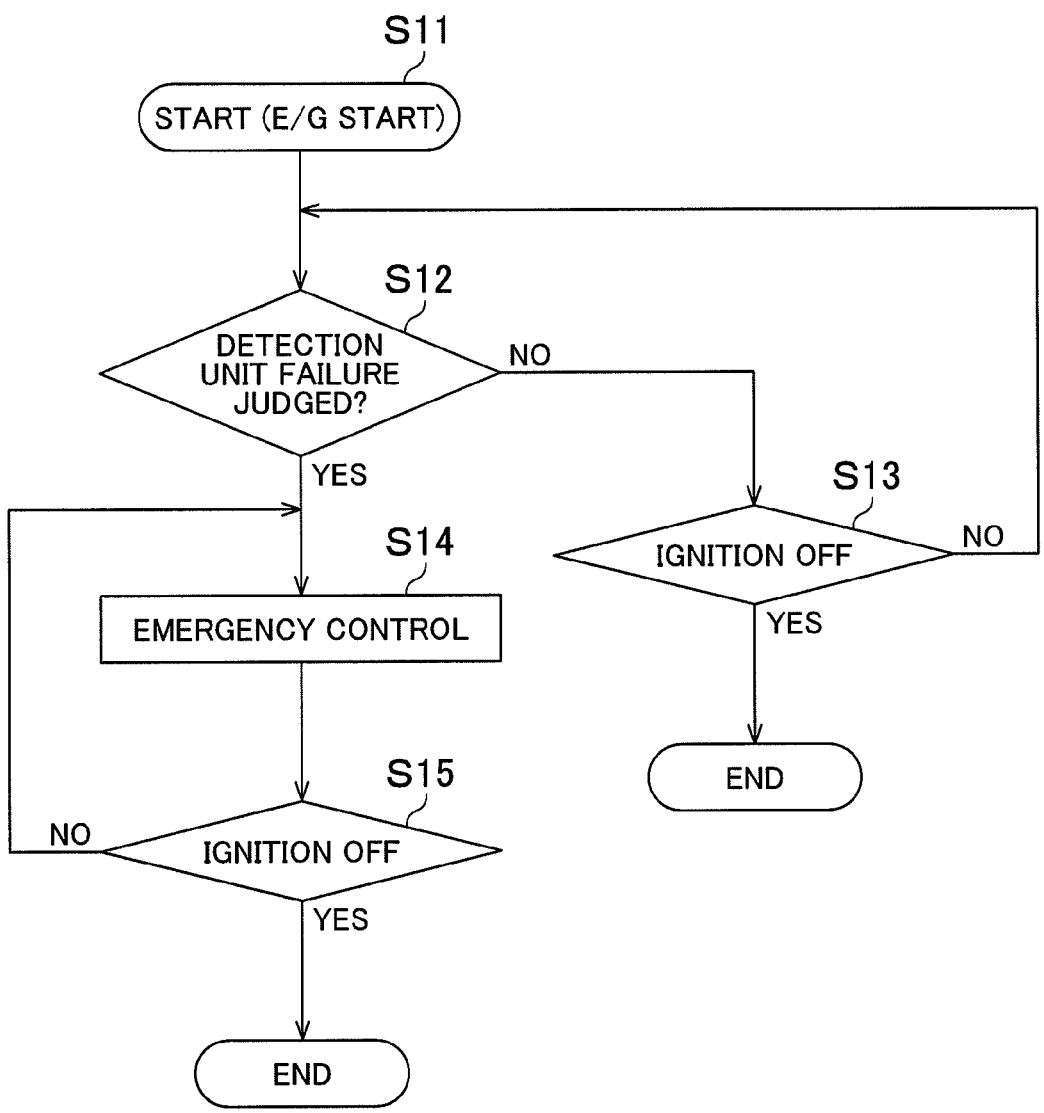

CONTROL SYSTEM FOR AUTOMATIC TRANSMISSION

INCORPORATION BY REFERENCE

The disclosure of Japanese Patent Application No. 2009-142481 filed on Jun. 15, 2009 including the specification, drawings and abstract is incorporated herein by reference in its entirety.

BACKGROUND OF THE INVENTION

The present invention relates to a control system for an automatic transmission mounted in a vehicle or the like. More specifically, the present invention relates to a so-called reverse inhibit control in which a reverse shift speed is not formed when the reverse shift speed is selected in error during forward travel.

DESCRIPTION OF THE RELATED ART

In a multi-speed automatic transmission mounted in a vehicle or the like, a plurality of (e.g. two) friction engagement elements (clutches and brakes) is hydraulically controlled to engage depending on the shift speed in order to form a transmission path of a speed change gear mechanism. In such an automatic transmission, conventionally, if a reverse range is selected in error during forward travel, a cut-off valve cuts off a supply of hydraulic pressure to the friction engagement elements used to form the reverse speed at a speed faster than a predetermined speed (e.g. 7 km/h) so that the reverse speed is not formed (see Japanese Patent Application Publication No. JP-A-2006-313003, for example).

A known automatic transmission has a constitution in which a shift range of a shift lever is detected by a detection unit such as a position sensor, shifting among shift ranges that include forward and reverse ranges is performed based on output signals of the position sensor, and failures of the position sensor are detected (see Japanese Patent Application Publication No. JP-A-2006-220669).

SUMMARY OF THE INVENTION

However, providing the cut-off valve as described above in order to perform a reverse inhibit control may increase the size and weight of the device, as well as raise production costs. If the reverse inhibit control is performed on the basis of output signals from a position sensor that detects the shift range, the reverse inhibit control may not be performed in the event of a failure of the position sensor.

Hence, the present invention realizes a control system for an automatic transmission having a structure that does not use a cut-off valve, and which can perform a reverse inhibit control even if a detection unit that detects a shift range selected by a shift selection unit fails.

According to a first aspect of the present invention, an avoidance unit is provided for shifting to a forward shift speed that does not engage the first friction engagement element, which engages in predetermined forward and reverse speeds, if a failure judgment unit judges that the detection unit has failed. Therefore, the reverse shift speed is not formed even if the detection unit has failed and cannot detect the shift range selected using the shift selection unit, and the reverse shift speed is selected in error during forward travel. In other words, in the event of a detection unit failure, the first solenoid valve that supplies and discharges an engagement pressure to the hydraulic servo of the first friction engagement element cannot regulate the pressure in accordance with the shift range selected using the shift selection unit. Therefore, if the reverse range is selected in error while the first friction engagement element is engaged during forward travel, the reverse shift speed may be formed. However, by shifting to a forward shift speed that does not engage (that releases) the first friction engagement element when the detection unit has failed as in the present invention, formation of the reverse shift speed can be suppressed even if the detection unit has failed and the reverse range is selected in error during forward travel. Thus, the reverse inhibit control can be executed even if the detection unit has failed. In addition, since there is no need to provide a cut-off valve, a smaller, lighter, and less expensive device can be achieved.

According to a second aspect of the present invention, the second friction engagement element that forms the reverse shift speed is engaged by the reverse range pressure supplied through the manual shift valve. Therefore, if the reverse shift range is selected in error during a failure of the detection unit, the second friction engagement element is engaged based on the shift range. Accordingly, by using a forward shift speed that does not engage the first friction engagement element, formation of the reverse shift speed can be reliably suppressed even if the reverse shift range is selected in error and the second friction engagement element is engaged.

According to a third aspect of the present invention, upshifting is performed to shift from the predetermined forward shift speed to a forward shift speed that does not engage the first friction engagement element. Therefore, it is possible to suppress a sudden increase in the engine speed that may cause over-revving, and operation of the engine brake that may cause a sudden change in the driving force.

According to a fourth aspect of the present invention, if a running speed becomes equal to or less than a predetermined speed during a failure of the detection unit, a shift is made to the predetermined forward shift speed that engages the first friction engagement element. Therefore, reverse travel is possible when the reverse shift range is selected using the shift selection unit.

BRIEF DESCRIPTION OF THE DRAWINGS

FIG. 3 is an engagement chart of the automatic transmission;

FIG. 6 is a flowchart that shows an overview of a control of the control system for the automatic transmission.

DETAILED DESCRIPTION OF THE EMBODIMENT

Figure 1:
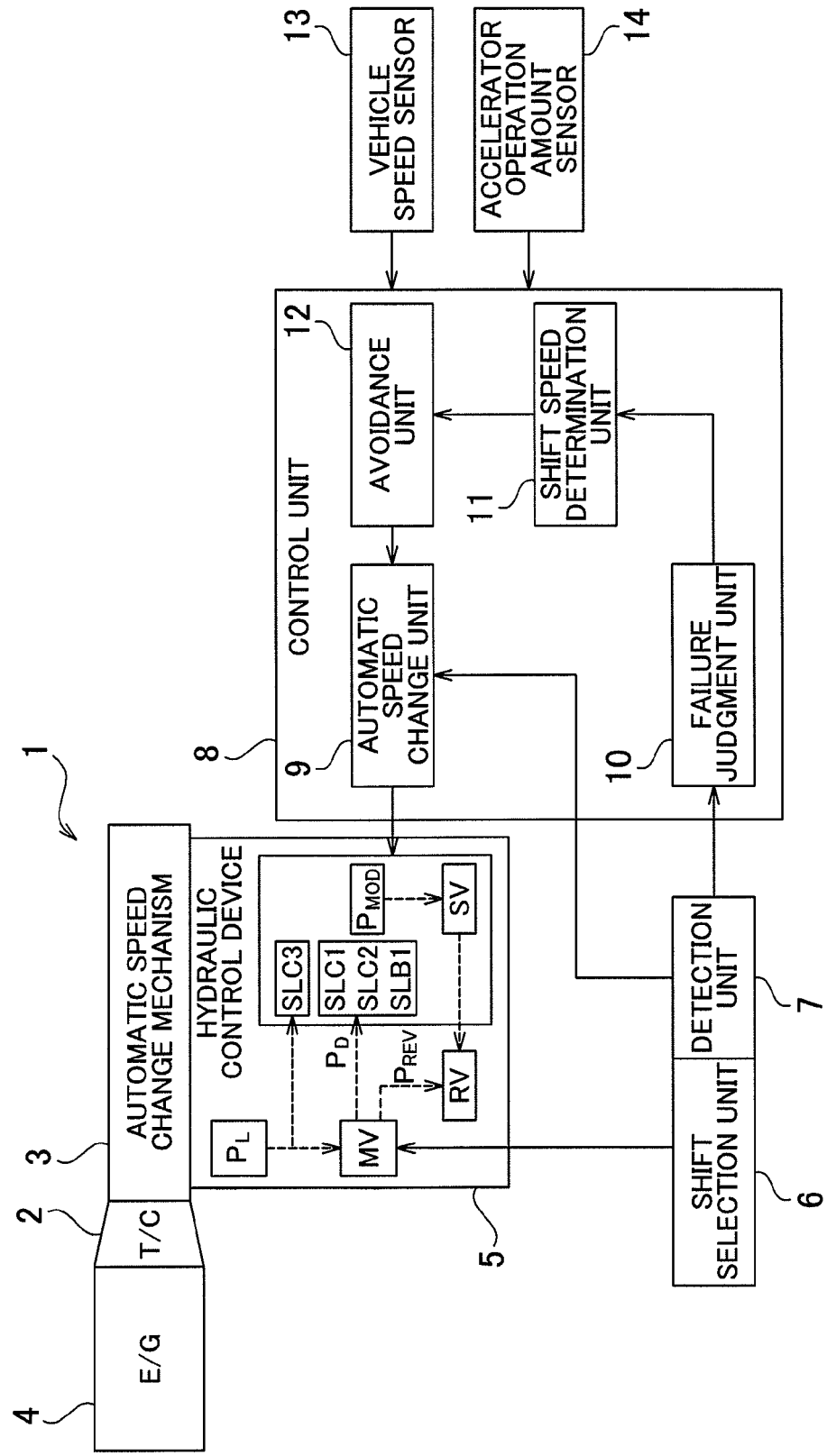
FIG. 1 is a block diagram that shows a control system for an automatic transmission according to an embodiment.

An embodiment of the present invention will be described below with reference to FIGS. 1 to 7. A brief overview of an automatic transmission and a control system therefor according to the present embodiment will be given based on FIGS. 1 and 2. As illustrated in FIG. 1, an automatic transmission 1 is well suited for use in an FF type (front engine, front wheel drive) vehicle, and is structured capable of achieving six forward speeds and one reverse speed. The automatic transmission 1 has a torque converter 2 and an automatic speed change mechanism 3. Torque from an engine (drive source) 4 is transmitted to the automatic speed change mechanism 3 through the torque converter 2. A control system for this automatic transmission includes a hydraulic control device 5 and a control unit (ECU) 8, in addition to the automatic speed change mechanism 3. The control system drives on the basis of signals from a detection unit 7 that detects a shift range selected by a shift selection unit 6 provided near the driver seat, and the like. The control unit 8 includes an automatic speed change unit 9, a failure judgment unit 10, a shift speed determination unit 11, and an avoidance unit 12, and is input with signals from a vehicle speed sensor 13, a accelerator operation amount sensor 14, and the like.

Figure 2:
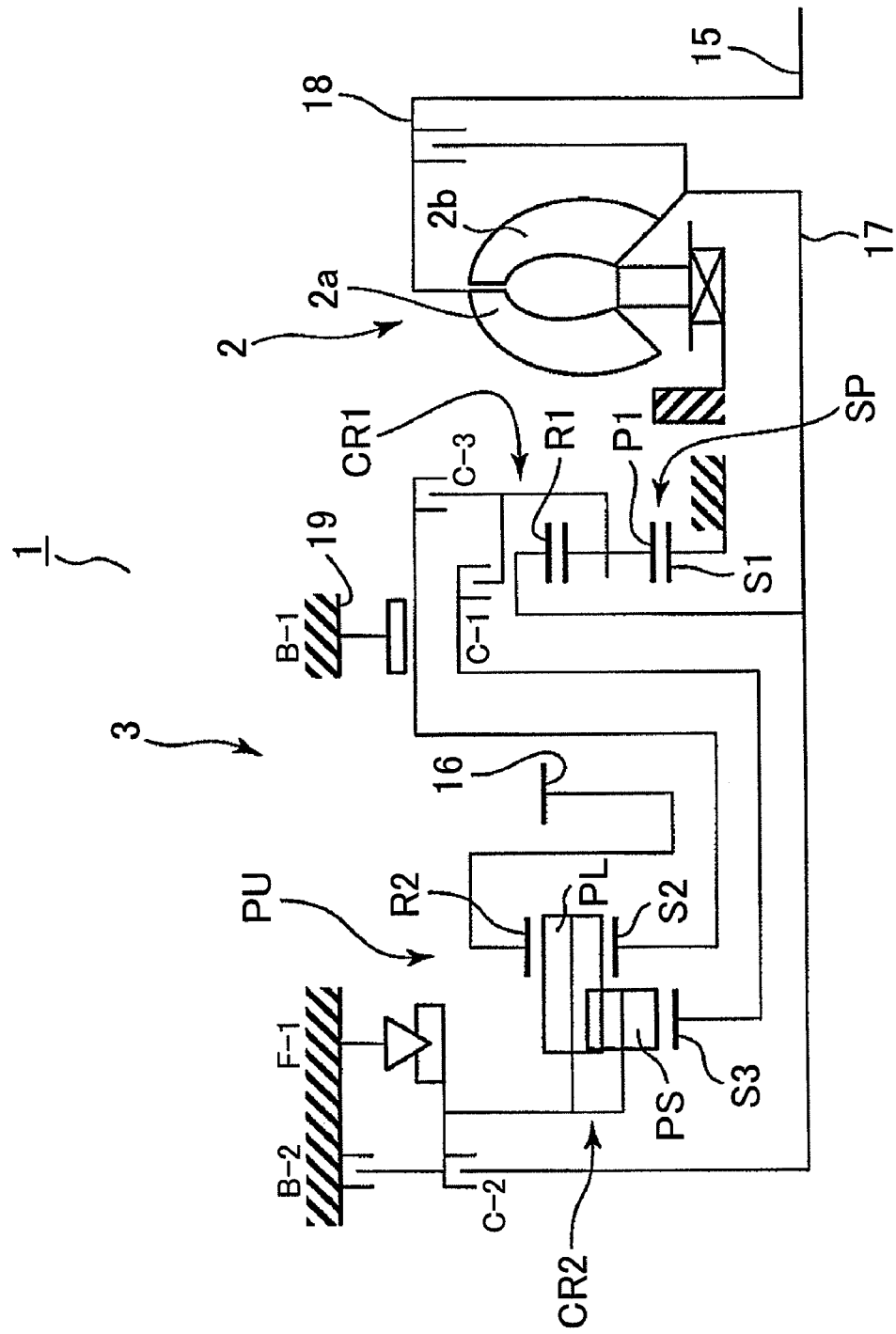
FIG. 2 is a skeleton diagram that shows the automatic transmission.

As illustrated in FIG. 2, in the automatic transmission 1, input from the engine 4 can be output to a counter gear (output shaft) 16 through an input shaft 15, the torque converter 2, and the automatic speed change mechanism 3. The torque converter 2 has a pump impeller 2a that is connected to the input shaft 15, and a turbine runner 2b to which the rotation of the pump impeller 2a is transmitted via a working fluid. The turbine runner 2b is connected to a rotation shaft 17 of the automatic speed change mechanism 3, which is coaxially disposed with the input shaft 15. The torque converter 2 is also provided with a lock-up clutch 18. Engagement of the lock-up clutch 18 directly transmits the rotation of the input shaft 15 to the rotation shaft 17 of the automatic speed change mechanism 3.

The automatic speed change mechanism 3 is formed from two planetary gear mechanisms arranged in parallel around the rotation shaft 17, namely a planetary gear (deceleration planetary gear) SP on the input side (right side in FIG. 2) and a planetary gear unit (planetary gear set) PU on the output side (left side in FIG. 2). The planetary gear SP disposed on the input side includes a sun gear S1, a carrier CR1, and a ring gear R1. The carrier CR1 has a pinion P1 that respectively meshes with the sun gear S1 and the ring gear R1. Therefore, the planetary gear SP is a so-called single pinion planetary gear.

The planetary gear unit PU disposed on the output side includes two sun gears S2, S3 with different numbers of teeth, a carrier CR2, and a ring gear R2. The carrier CR2 has a long pinion PL that meshes with the sun gear S2 and the ring gear R2, and a short pinion PS that meshes with the sun gear S3, in a form where the long pinion PL and the short pinion PS also mesh together. Therefore, the planetary gear unit PU is a so-called Ravigneaux type planetary gear.

The sun gear S1 forming the planetary gear SP on the input side is held stationary on a boss portion that is integratedly fixed to a transmission case 19. The ring gear R1 is fixed to the rotation shaft 17, which is rotatably supported by the transmission case 19, and the ring gear R1 rotates together with the rotation shaft 17. The carrier CR1 meshes with the stationary sun gear S1 and the ring gear R1 that rotates together with the rotation shaft 17, which causes the input rotation of the ring gear R1 to be decelerated and then output. The carrier CR1 is connected to clutches C-1, C3, which are friction engagement elements, and the rotation of the carrier CR1 can be output to the planetary gear unit PU on the output side through the clutches C-1, C-3.

The sun gear S2 that forms the planetary gear unit PU on the output side and meshes with the long pinion PL is connected to the clutch C-3. Engagement of the clutch C-3 causes the deceleration rotation of the carrier CR1 to be input to the sun gear S2. The sun gear S2 can also be held stationary in relation to the transmission case 19 by engagement of a brake B-1, which is a friction engagement that is fixed to the transmission case 19. The sun gear S3 that meshes with the short pinion PS is connected to the clutch C-1. Engagement of the clutch C-1 causes the deceleration rotation of the carrier CR1 to be input to the sun gear S3.

The carrier CR2 is connected to a clutch C-2, which is a friction engagement element that is input with the rotation of the rotation shaft 17. Engagement of the clutch C-2 causes the rotation of the rotation shaft 17 to be input to the carrier CR2. A one-way clutch F-1 disposed between the transmission case 19 and the carrier CR 2 restricts the rotation of the carrier CR2 to one direction in relation to the transmission case 19. The carrier CR2 can also be held stationary in relation to the transmission case 19 by engagement of a brake B-2, which is a friction engagement. The ring gear R2 is connected to the counter gear (output shaft) 16, and rotation input to the ring gear R2 is transmitted to the counter gear 16. The counter gear 16 is connected to a drive wheel through a counter shaft and a differential device not shown in the drawings. Note that the clutches C-1, C-2, C-3 and the brake B-2 may be multi-disc clutches and the brake B-1 may be a band brake, for example.

As illustrated in FIG. 3, the automatic transmission 1 structured as described above forms first (1st) to sixth (6th) forward speeds and one reverse (REV) speed by selectively engaging the plurality of friction engagement elements (clutches C-1, C-2, C-3 and brakes B-1, B-2). These friction engagement elements are controlled by the hydraulic control device 5.

The hydraulic control device 5 will be briefly described with reference to FIG. 1. Note that the dashed lines in FIG. 1 indicate a hydraulic pressure route. Hydraulic pressure generated by an oil pump (O/P) not shown in the drawing is regulated to a line pressure $P_L$ in response to a throttle opening or the like. The line pressure $P_L$ is supplied to a solenoid modulator valve (not shown), a manual shift valve MV, a linear solenoid valve SLC3 described later, and the like. The line pressure $P_L$ supplied to the solenoid modulator valve is regulated by this valve to a modulator pressure $P_{MOD}$ that is generally constant, and the modulator pressure $P_{MOD}$ is supplied as a source pressure to a solenoid valve SV described later and the like.

Figure 4:
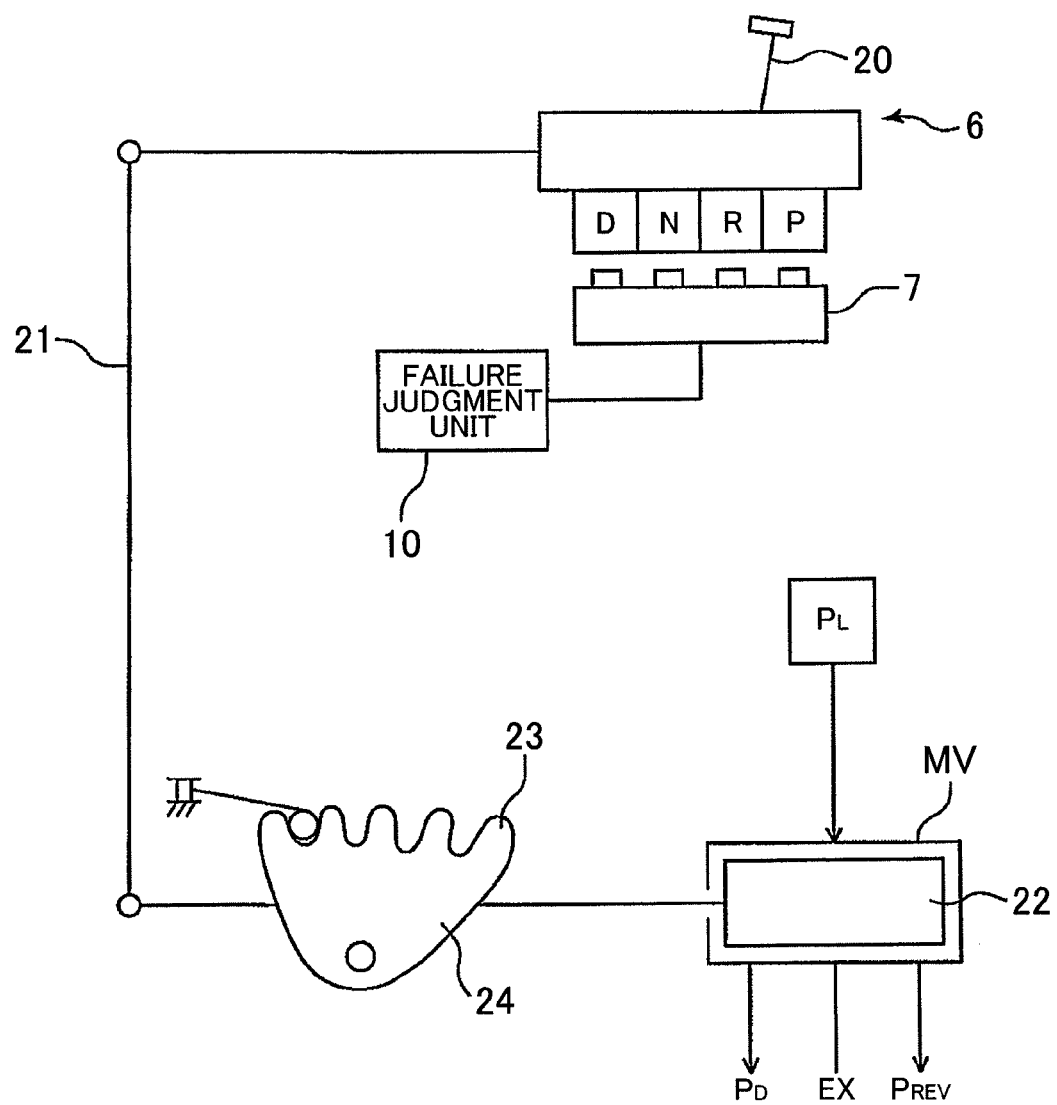
FIG. 4 is a schematic diagram that shows a mechanism between a shift lever and a manual shift valve.

As illustrated in FIGS. 1, 4 and 5, the manual shift valve MV switches the hydraulic pressure route depending on the shift range selected by a shift lever 20 (FIG. 4) of the shift selection unit 6, so that the line pressure $P_L$ supplied to the manual shift valve MV can be set to a forward range pressure $P_D$, a reverse range pressure $P_{REV}$, or a state of non-output. The shift selection unit 6 selects from shift ranges including a forward range (D range) and a reverse range (R range), and is operated using the shift lever 20.

More specifically, as illustrated in FIG. 4, the manual shift valve MV has a spool 22 that is mechanically driven by the shift lever 20 provided near the driver seat through a link mechanism 21 or the like. Switching the position of the spool 22 depending on the shift range (e.g. P, R, N, D) selected using the shift lever 20 sets the input of the line pressure $P_L$ to an output state ($P_D$, $P_{REV}$) or a non-output state (drain, EX). Note that in the example of the drawing, a detent mechanism 23 is provided among the line mechanism 21, and is designed to apply appropriate resistance when the shift lever 20 is operated. Aside from a structure operated using the shift lever 20, the shift selection unit 6 may also be a structure that transmits electrical signals from an operation portion such as a button, for example. In such case, the position of the spool 22 may be switched by an actuator or the like that is driven by the electrical signals.

Switching of the output state of the line pressure $P_L$ by the manual shift valve MV is performed as described below. If the D range is selected according to an operation of the shift lever 20, an input port that is input with the line pressure PL communicates with a forward range pressure output port on the basis of the position of the spool 22. The line pressure $P_L$ is then output as the forward range pressure (D range pressure) $P_D$ from the forward range pressure output port. If the R (Reverse) range is selected according to an operation of the shift lever 20, the input port communicates with a reverse range pressure output port on the basis of the position of the spool 22. The line pressure $P_L$ is then output as the reverse range pressure (R range pressure) $P_{REV}$ from the reverse range pressure output port. Note that if a P (Parking) range or an N (Neutral) range is selected according to an operation of the shift lever 20, the input port is cut off from the forward range pressure output port and the reverse range pressure output port by the spool 22, and the forward range pressure output port and the reverse range pressure output port communicate with a drain port (EX). Thus, the D range pressure $P_D$ and the R range pressure $P_{REV}$ are drained (discharged) and a non-output state is achieved.

The shift range selected using the shift lever 20 as described above is detected by the detection unit 7, which may be switch terminals or the like provided for each range, P, R, N and D, of the shift lever 20. Alternatively, the detection unit 7 may also, for example, detect a rotation angle of a manual shaft that is rotated by switching the shift lever 20, or detect a position of a detent 24 of the detent mechanism 23, or detect a position of the spool 22 of the manual shift valve MV. In any case, a plurality of solenoid valves including linear solenoid valves of the hydraulic control device 5 described next is operated based on the signal detected by the detection unit 7. However, the manual shift valve MV is not dependent on the signal of the detection unit 7 and operates based on the shift range of the shift lever 20, which is transmitted through the link mechanism 21 and the like.

As illustrated in FIGS. 1 and 5, the D range pressure $P_D$ and the R range pressure $P_{REV}$ regulated by the manual shift valve MV and the line pressure $P_L$ are supplied to linear solenoid valves SLC1, SLC2, SLC3, SLB1, and a relay valve RV, while the modulator pressure $P_{MOD}$ is supplied as a source pressure to the solenoid valve SV. The solenoid valves SLC1, SLC2, SLB1, which are supplied with the D range pressure $P_D$, each drive hydraulic servos of the clutches C-1, C-2 and the brake B-1 through relay valves or the like. The relay valve RV, which is supplied with the R range pressure $P_{REV}$, is driven based on a signal pressure of the solenoid valve SV and drives the hydraulic servo of the brake B-2. The linear solenoid valve SLC3, which is directly supplied with the line pressure $P_L$ that does not pass through the manual shift valve MV, drives the hydraulic servo of the clutch C-3.

As illustrated in FIG. 1, the hydraulic control device 5 structured as described above is driven by the automatic speed change unit 9 within the control unit 8 on the basis of signals from the vehicle speed sensor 13, the accelerator operation amount sensor 14, and the like, in addition to being driven by the shift range selection made using the shift lever 20. In other words, the above solenoid valves are controlled on the basis of a shift diagram within the automatic speed change unit 9, using the vehicle running speed (vehicle speed) detected by the vehicle speed sensor 13 and the accelerator operation amount detected by the accelerator operation amount sensor 14, and the like. As illustrated in FIG. 3, predetermined clutches and brakes are selectively engaged to form a desired shift speed. Note that a sensor that detects the rotation speed of a counter shaft that transmits power from the counter gear 16 of the automatic transmission 1 to the drive wheel, a sensor that detects the rotation speed of the drive wheel, and the like may be used as the vehicle speed sensor 13, for example.

Figure 5A:
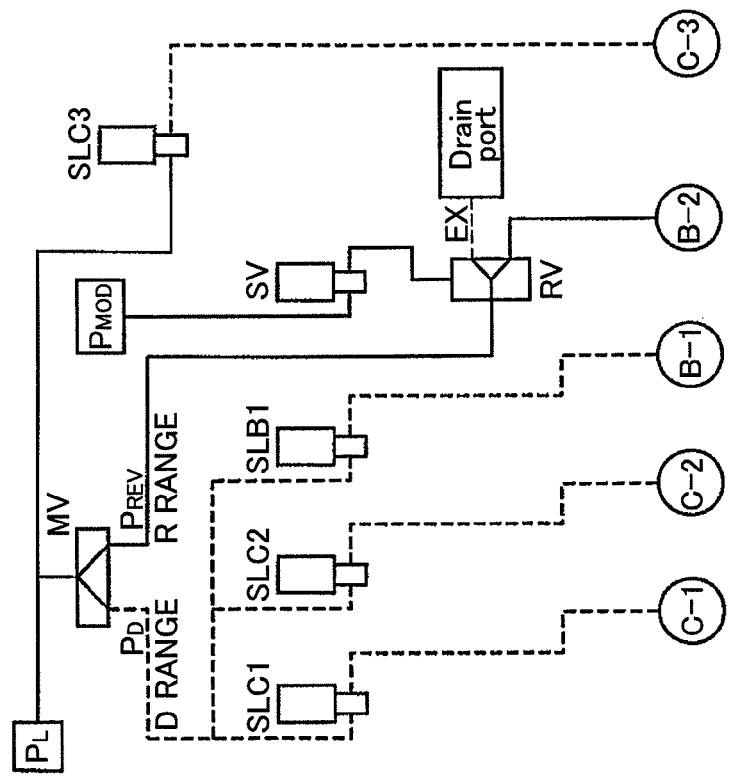
FIG. 5 shows schematic diagrams of essential portions of a hydraulic circuit to explain a reverse inhibit control during times of normal operation and detection unit failure.

In order to form the reverse shift speed, REV, as illustrated in FIG. 3 mentioned earlier, the clutch C-3 that is a first friction engagement element and the brake B-2 that is a second friction engagement element may each be engaged. However, if the driver shifts the shift lever 20 in error to the R range while the running speed is faster than a predetermined speed (e.g. 7 km/h), as shown in FIG. 5A, the linear solenoid valve SLC3 closes, which cuts off the supply of hydraulic pressure from the valve SLC3. In addition, electricity is conducted to the solenoid valve SV (the valve SV is turned on), which sets the spool of the relay valve RV to a predetermined position that cuts off the supply of the R range pressure $P_{REV}$. However, while in this state, the position of the spool 22 of the manual shift valve MV is a position that supplies the R range pressure $P_{REV}$. Therefore, the D range pressure PD is not supplied to the hydraulic servos of the clutches C-1, C-2 and the brake B-1. Consequently, the automatic transmission 1 set to the neutral state. Note that among the hydraulic pressure routes shown in FIGS. 5A and 5B described later, solid lines indicates portions supplied with hydraulic pressure and dashed lines indicate portions not supplied with hydraulic pressure.

A reverse inhibit control that is normally performed when the detection unit 7 has not failed was described above; however, in the event of a failure of the detection unit 7, the above reverse inhibit control cannot be performed. Namely, the linear solenoid valve SLC3 and the solenoid valve SV are driven by signals from the detection unit 7. Therefore, if the detection unit 7 fails, the state before the failure is maintained regardless of the shift range selected using the shift lever 20. In other words, if the detection unit 7 fails, the solenoid valves SLC3, SV do not drive even if the shift range is changed using the shift lever 20. At such time, if engagement pressure regulated by the linear solenoid valve SLC3 is supplied to the hydraulic servo of the clutch C-3, the clutch C-3 remains engaged even if the driver sets the shift lever 20 in error to the R range.

Meanwhile, regardless of the failure of the detection unit 7, the manual shift valve MV drives so as to shift to the shift range selected using the shift lever 20. Therefore, the position of the spool 22 of the manual shift valve MV is set for the R range. Since the solenoid valve SV is not driven, the relay valve RV can supply the R range pressure $P_{REV}$ to the brake B-2. Thus, the R range pressure $P_{REV}$ is supplied as an engagement pressure to the brake B-2, and the relationship of the engaged brake B-2 and the engaged clutch C-3 forms the Rev speed.

According to the present embodiment, in order suppress an inability to perform the reverse inhibit control in the event of a failure of the detection unit 7, the clutch C-3 is not engaged if the detection unit 7 fails. In the case of the present embodiment, as illustrated in FIG. 1, the failure judgment unit 10 is provided to judge failure of the detection unit 7. For the failure judgment unit 10, a device that electrically detects a disconnection or a short circuit of the detection unit 7, or a device that detects a stack fault of a position sensor that detects the rotation angle of the manual shaft, such as the structure described in JP-A-2006-220669, may be used.

In any case, if the failure judgment unit 10 judges that the detection unit 7 has failed, a command is transmitted from the avoidance unit 12 to the automatic speed change unit 9 so that the clutch C-3, which is the first friction engagement element that engages in predetermined forward and reverse shift speeds, is not engaged. The avoidance unit 12 transmits a command to the automatic speed change unit 9 only when the failure of the detection unit 7 has been established. The avoidance unit 12 drives on the basis of a signal indicating that the failure judgment unit 10 judged that the detection unit 7 has failed, a signal from the shift speed determination unit 11 that determines the shift speed when the judgment was made, and a signal from the vehicle speed sensor 13.

More specifically, if the failure judgment unit 10 judges that the detection unit 7 has failed while the running speed detected by the vehicle speed sensor 13 is faster than a predetermined speed (e.g. 7 km/h), the shift speed determination unit 11 determines whether the third forward speed (3rd) or the fifth forward speed (5th) which engage the clutch C-3 is currently in use. If the shift speed determination unit 11 determines that 3rd or 5th is currently in use, a command is transmitted from the avoidance unit 12 to the automatic speed change unit 9 so as to shift to and lock in the fourth forward speed (4th) or the sixth forward speed (6th), which do not engage the clutch C-3. In other words, an upshift to 4th is made if in 3rd and an upshift to 6th is made if in 5th so as to avoid 3rd and 5th, which engage the clutch C-3. Note that an upshift is made instead of a downshift because downshifting may suddenly increase the engine speed and cause over-revving, or the engine brake may operate and cause a sudden change in the driving force. Upshifting is thus used instead to suppress such occurrences.

However, if the failure judgment unit 10 judges that the detection unit 7 has failed while the running speed detected by the vehicle speed sensor 13 is faster than a predetermined speed (e.g. 7 km/h), and the shift speed determination unit 11 determines that a shift speed that does not engage the clutch C-3 (1st, 2nd, 4th, or 6th) is currently in use, a command is transmitted from the avoidance unit 12 to the automatic speed change unit 9 so as to lock the automatic transmission 1 in that shift speed. Consequently, a shift to 3rd or 5th, which engage the clutch C-3, is avoided.

Note that the shift speed determination unit 11 may determine the shift speed at the time of the detection unit 7 failure on the basis of the shift diagram within the automatic speed change unit 9, using the vehicle speed detected by the vehicle speed sensor 13 and the accelerator operation amount detected by the accelerator operation amount sensor 14. However, the shift speed determination unit 11 may be omitted. Alternatively, a command may be transmitted from the avoidance unit 12 to the automatic speed change unit 9 such that, regardless of the shift speed at the time of the detection unit 7 failure, an appropriate shift speed other than 3rd and 5th is selected based on the vehicle speed detected by the vehicle speed sensor 13 and the accelerator operation amount detected by the accelerator operation amount sensor 14. In such case, a separate shift diagram constituted by shift speeds other than 3rd and 5th may be provided within the automatic speed change unit 9, and the avoidance unit 12 may transmit a command to use this separate shift diagram. Furthermore, in this case, a forward shift speed other than 3rd or 5th may be selected for travel as appropriate without locking the shift speed.

Figure 5B:
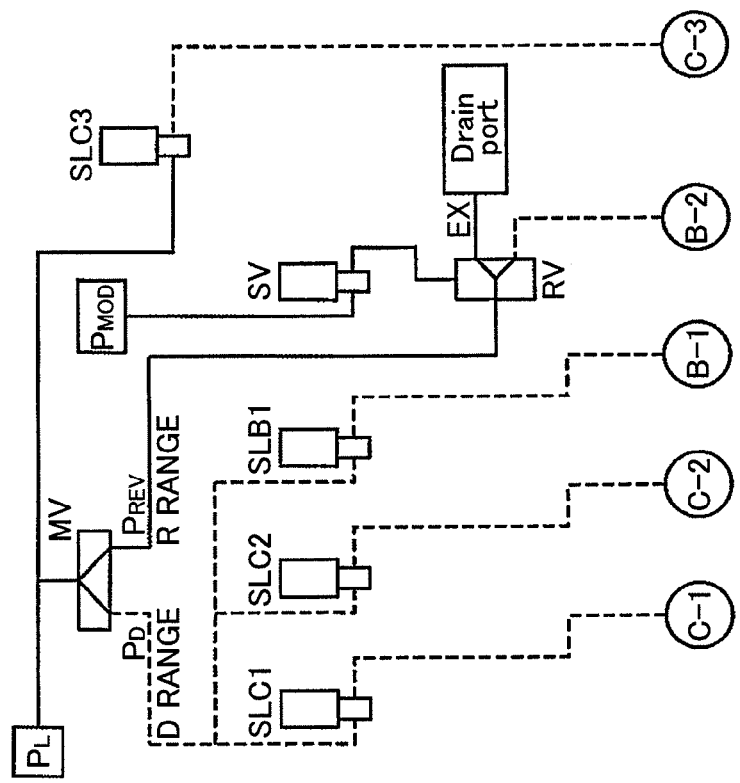

As described above, the driver may shift the shift lever 20 in error to the R range while traveling in a forward shift speed that does not engage the clutch C-3, such as while the shift speed is shifted to 4th or 6th, or locked in 1st, 2nd, 4th, or 6th. In such case, the manual shift valve MV switches to the R range. However, due to a failure of the detection unit 7, the solenoid valves SLC1, SLC2, SLC3, SLB1, SV do not operate. Consequently, as shown in FIG. 5B, the brake B-2 engages while the other clutches C-1, C-2 and the brake B-1 are released. In other words, the D range pressure $P_D$ is cut off by the manual shift valve MV, which releases the clutches C-1, C2 and the brake B-1. Because the clutch C-2 is already released due to shifting to 4th or 6th, or the shift speed being locked in 1st, 2nd, 4th, or 6th, the Rev speed is not formed.

If the vehicle speed detected by the vehicle speed sensor 13 is equal to or less than the predetermined speed in the event of a detection unit 7 failure, the avoidance measure performed by the avoidance unit 12 as described above is cancelled. And a shift is made to 3rd if the shift speed is any one of 1st, 2nd, 4th, or 6th. Thus, by shifting to 3rd and engaging the clutch C-3, the driver can shift to the Rev speed if backing up, such as when parking the vehicle in a garage or the like, is necessary. In other words, if the shift lever 20 is shifted to the R range, the engaged state of the clutch C-3 due to the failure of the detection unit 7 is maintained, and the brake B-2 is engaged due to the output of the R range pressure $P_{REV}$ by the manual shift valve MV. Consequently, the Rev speed is formed. However, if the vehicle speed again becomes faster than the predetermined speed after running in 3rd as described above, a command is sent from the avoidance unit 12 to the automatic speed change unit 9 to avoid a shift speed that engages the clutch C-3. Thus, the Rev speed is prevented from being formed as a result of the driver's wrong operation.

An example of the flow of the above control will be described using FIGS. 6 and 7. Referring to FIG. 6, if the engine (E/G) is started by turning the ignition on (S11), the failure judgment unit 10 judges whether the detection unit 7 has failed (S12). If the detection unit 7 has not failed, the judgment of failure of the detection unit 7 (S12) is executed until the ignition is turned off (S13). However, if it is judged at S12 that the detection unit 7 has failed, an emergency control described later is executed (S14), and the emergency control is continued until the ignition is turned off (S15).

Figure 7:
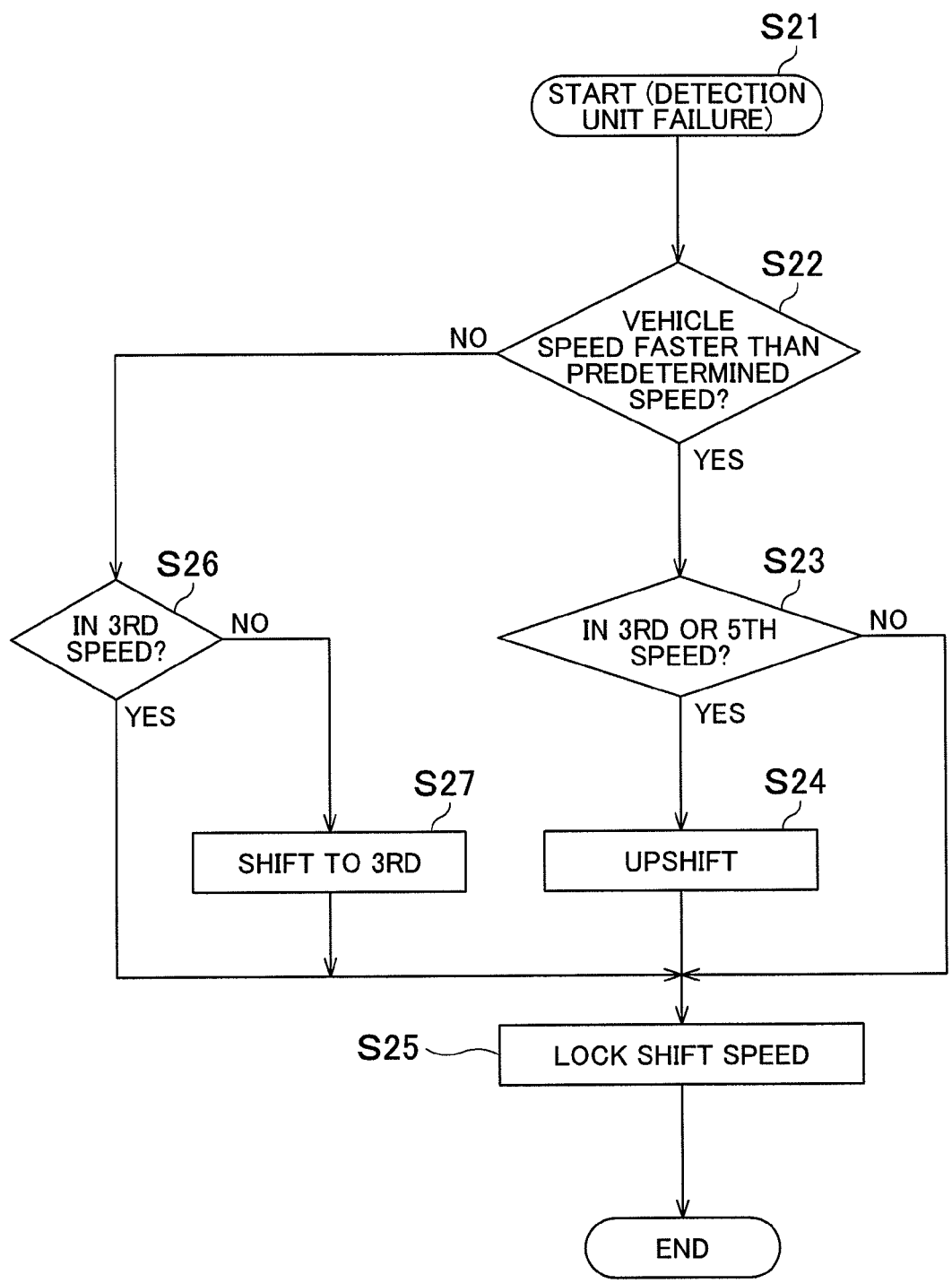
FIG. 7 is a flowchart that shows a control of the control system for the automatic transmission in the event of a detection unit failure.

Referring to FIG. 7, the emergency control is started if failure of the detection unit 7 is established by the failure judgment unit 10 (S21). Next, if the vehicle speed detected by the vehicle speed sensor 13 is faster than the predetermined speed (S22), the shift speed determination unit 11 determines whether the shift speed was 3rd or 5th at the time that failure of the detection unit 7 was established (S23). If the shift speed was 3rd or 5th, a command from the avoidance unit 12 causes an upshift of one speed so that an upshift to 4th is made if the shift speed was 3rd, and an upshift to 6th is made if the shift speed was 5th (S24). The automatic transmission 1 is then locked in that shift speed (S25). However, at S23, if the shift speed was not 3rd or 5th at the time that failure of the detection unit 7 was established, no shift change is performed and the automatic transmission 1 is locked in the present shift speed (S25). Thus, when the detection unit 7 has failed and the vehicle speed is faster than the predetermined speed, the reverse inhibit control is executed.

Meanwhile, if the vehicle speed is equal to or less than the predetermined speed at S22, the shift speed determination unit 11 determines whether the shift speed is 3rd (S26). If the shift speed is not 3rd, the shift speed is shifted to 3rd (S27). However, if the shift speed is 3rd, no shift is performed and the shift speed is locked in 3rd. As described above, shifting to a reverse shift speed is thus possible if the driver needs to back up. Note that if the vehicle speed increases and becomes faster than the predetermined speed, the reverse inhibit control as described above is executed again. This control is executed until the ignition is turned off at S15 in FIG. 6.

According to the present embodiment, the reverse inhibit control can be executed even if the detection unit 7 has failed.

In other words, as described above, if the failure judgment unit 10 judges that the detection unit 7 has failed while the running speed is faster than the predetermined speed, the avoidance unit 12 takes measures to shift to any one of 1st, 2nd, 4th, or 6th. This is to ensure that, among the friction engagement elements of the clutches C-1, C-2, C-3 and the brakes B-1, B-2, the clutch C-3 that engages in predetermined forward shift speeds (3rd and 5th) and the reverse speed (REV) does not engage. Therefore, even if the detection unit 7 has failed and the R range is selected in error during forward travel, the reverse shift speed is not formed. Thus, the reverse inhibit control can be executed even if the detection unit 7 has failed. Because travel is possible at a forward shift speed that does not engage the clutch C-3 during a failure of the detection unit 7, the vehicle can travel to a safe location or maintenance shop, for example. In addition, since there is no need to provide a cut-off valve, a smaller, lighter, and less expensive device can be achieved.

In the embodiment described above, the present invention is applied to an automatic transmission capable of achieving six forward speeds. However, the present invention is obviously not limited to this example. For example, the present invention may be applied to any structure provided that the structure has a first friction engagement element that engages in predetermined forward and reverse shift speeds, such as the fourth, fifth, seventh, or even eighth forward speeds. According to the present embodiment, at a predetermined speed or above, an avoidance measure is taken to shift to a shift speed that does not engage the first engagement element. However, the avoidance measure may be taken regardless of the vehicle speed (e.g. even if the vehicle speed is 0 km/h). In such case, although there is a risk that the reverse shift speed cannot be formed, the reverse inhibit control can be surely executed in the event of a detection unit failure.

The control system for an automatic transmission according to the present invention can be used in an automatic transmission mounted in a passenger vehicle, truck, bus, farm machinery, or the like. The control system is particularly well suited for use in a structure capable of reverse inhibit control that calls for a smaller, lighter device and lower costs.

What is claimed is:

1. A control system for an automatic transmission having an automatic speed change mechanism that selectively engages a plurality of friction engagement elements, which are engaged based on engagement pressures that are respectively supplied to a plurality of hydraulic servos, to form a plurality of forward and reverse shift speeds, and
   a solenoid valve that regulates and discharges a line pressure as an engagement pressure to a hydraulic servo of a first friction engagement element among the friction engagement elements, which is engaged in predetermined forward and reverse shift speeds, the control system comprising:
   a failure judgment unit for judging failure of a detection unit that detects a shift range selected using a shift selection unit for selecting from shift ranges that include a forward range and a reverse range; and
   an avoidance unit for shifting to a forward shift speed that does not engage the first friction engagement element if the failure judgment unit determines that the detection unit has failed.

2. The control system for an automatic transmission according to claim 1, further comprising:
   a manual shift valve that sets the line pressure to one of a forward range pressure and a reverse range pressure based on the shift range selected using the shift selection unit, wherein
   the reverse shift speed is formed by engaging the first friction engagement element and a second friction engagement element among the friction engagement elements, and
   the second friction engagement element is engaged by the reverse range pressure supplied through the manual shift valve.

3. The control system for an automatic transmission according to claim 1, wherein
   the avoidance unit upshifts if the failure judgment unit judges that the detection unit has failed during travel in the predetermined forward shift speed.

4. The control system for an automatic transmission according to claim 1, wherein
   the avoidance unit, if a running speed becomes equal to or less than a predetermined speed during a failure of the detection unit, cancels shifting to a forward shift speed that does not engage the first friction engagement element and shifts to the predetermined forward shift speed that engages the first friction engagement element.

* * * * *